United States Patent
Halpert et al.

(10) Patent No.: US 6,545,221 B1
(45) Date of Patent: Apr. 8, 2003

(54) SPLICE SYSTEM FOR USE IN SPLICING COILED TUBING HAVING INTERNAL POWER CABLE

(75) Inventors: Pinke Halpert, Lawrence, KS (US); Lee S. Kobylinski, Bartlesville, OK (US); Marcus D. McHugh, Lawrence, KS (US); Howard A. Oswald, Lawrence, KS (US); John C. Pursell, Bartlesville, OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/447,383

(22) Filed: Nov. 23, 1999

(51) Int. Cl.$^7$ ................................................. H01R 4/00
(52) U.S. Cl. .................... 174/84 R; 174/47; 166/65.1
(58) Field of Search .......................... 174/74 R, 75 F, 174/84 R, 86, 88 R, 47; 367/25; 166/385, 65.1, 68, 242; 138/111, 125

(56) References Cited

U.S. PATENT DOCUMENTS

| | | | |
|---|---|---|---|
| 509,603 A | 11/1893 | Noll | |
| 1,188,485 A | 6/1916 | Pruyn | |
| 1,797,691 A | 3/1931 | Merrill | |
| 2,748,358 A | 5/1956 | Johnston | 339/16 |
| 4,003,435 A | 1/1977 | Cullen et al. | 166/315 |
| 4,509,343 A * | 4/1985 | Brister | 62/514 R |
| 4,523,465 A * | 6/1985 | Fasching et al. | 73/290 |
| 4,530,527 A | 7/1985 | Holmberg | 285/382.4 |
| 4,616,537 A | 10/1986 | Axford et al. | 82/5 |
| 4,660,910 A | 4/1987 | Sharp et al. | 339/16 R |
| 4,690,212 A | 9/1987 | Termohlen | 166/65.1 |
| 4,759,406 A | 7/1988 | Smith et al. | 166/65.1 |
| 4,942,926 A | 7/1990 | Lessi | 166/385 |
| 4,945,995 A | 8/1990 | Tholance et al. | 166/375 |
| 4,997,384 A | 3/1991 | Godfrey et al. | 439/190 |
| 5,060,737 A | 10/1991 | Mohn | 175/104 |
| 5,115,484 A | 5/1992 | Johnson | 385/72 |
| 5,122,209 A | 6/1992 | Moore et al. | 156/54 |
| 5,219,298 A | 6/1993 | Morin et al. | 439/192 |
| 5,251,942 A * | 10/1993 | Whaley | 285/355 |
| 5,269,377 A * | 12/1993 | Martin | 166/385 |
| 5,348,492 A | 9/1994 | Sonnet | 439/194 |
| 5,377,747 A * | 1/1995 | Didier | 166/65.1 |
| 5,389,003 A * | 2/1995 | Van Steenwyk et al. | 439/191 |
| 5,524,937 A | 6/1996 | Sides, III et al. | 285/133.1 |
| 5,670,747 A * | 9/1997 | Lawer et al. | 174/74 R |
| 5,820,416 A * | 10/1998 | Carmichael | 439/668 |
| 5,828,003 A * | 10/1998 | Thomeer et al. | 174/69 |
| 5,954,136 A * | 9/1999 | McHugh et al. | 166/384 |
| 6,032,733 A * | 3/2000 | Ludwig et al. | 166/60 |
| 6,145,597 A * | 11/2000 | Kobylinski | 166/384 |

FOREIGN PATENT DOCUMENTS

| | | | |
|---|---|---|---|
| EP | 0 612 913 | 8/1994 | E21B/17/02 |
| GB | 2 167 616 | 5/1986 | H02G/15/10 |
| GB | 2167616 A * | 5/1986 | H02G/15/10 |
| GB | 2 327 441 | 1/1999 | E21B/17/20 |
| GB | 2 340 155 | 2/2000 | E21B/17/20 |

\* cited by examiner

*Primary Examiner*—Dean A. Reichard
*Assistant Examiner*—William H. Mayo, III
(74) *Attorney, Agent, or Firm*—Fletcher, Yoder & Van Someren; Jeffrey E. Griffin; Brigitte Jeffery

(57) ABSTRACT

A system for splicing coiled tubing used in deploying downhole equipment and having an internal power cable. The system includes first and second segments of coiled tubing each having power cable disposed therein. Additionally, mounting fixtures are attached to the ends of the coiled tubing segments that are to be joined. The system further includes a movable canister that may be slid over the spliced segments of power cable and selectively engaged with the mounting fixtures. The canister provides structural integrity to the overall deployment tubing while protecting the internal power cable splice.

18 Claims, 5 Drawing Sheets

SPLICE SYSTEM FOR USE IN SPLICING COILED TUBING HAVING INTERNAL POWER CABLE

FIELD OF THE INVENTION

The present invention relates generally to tubing deployment systems, such as those used to deploy electric submergible pumping systems within a wellbore, and particularly to a splice system for splicing together segments of tubing, such as coiled tubing, having internal power cable.

BACKGROUND OF THE INVENTION

Various types of equipment are used in the production of fluid, such as petroleum, from subterranean locations. For example, pumping systems are utilized in pumping oil and/or other production fluids from producing wells. An exemplary pumping system is an electric submergible pumping system that includes components such as a motor, motor protector, pump and pump intake. The system is deployed within a wellbore by a deployment system, such as tubing used to suspend the system as it is moved to a desired location in the wellbore. Tubing, e.g. coiled tubing, can be used to locate components at substantial subterranean depths.

In some systems, the central hollow opening of the tubing is used for the production of fluid therethrough. In other applications, however, the internal opening of the tubing is used to hold power cable routed to the submergible components that require power. An electric submergible motor is an example of a component requiring power. In such systems, the production fluid typically is produced external to the tubing.

For a variety of reasons, it can become necessary to splice together two or more segments of tubing when delivering a downhole system or component to a desired depth within the wellbore. Heretofore, no one has had significant success in developing a dependable system for splicing adjacent sections of coiled tubing having an internal power cable.

It would be advantageous to have a system that readily permitted the formation of a splice for adjacent segments of tubing having power cable disposed therein.

SUMMARY OF THE INVENTION

The present invention features a coiled tubing system in which sequential segments of coiled tubing are spliced together for deployment of downhole equipment. The system includes a first segment of coiled tubing having a first power cable disposed within its hollow center. The system also includes a second segment of coiled tubing having a second power cable disposed within its hollow interior. First and second mounting fixtures are connected to the first and second segments of coiled tubing, respectively. Additionally, a canister is designed to provide a rigid connection between the first and the second mounting fixtures. The canister is designed for release such that it may be slid along either the first or second segment of coiled tubing to accommodate splicing of the first and the second power cables intermediate the first and the second mounting fixtures. The canister is further designed to securely engage both the first and the second mounting fixtures and to contain the cable splice therein.

According to another aspect of the invention, a system is provided for connecting sections of tubing that carry power cable therein for providing power to well-related equipment. The system includes a pair of fixtures attachable to individual sections of tubing. Additionally, the system includes a canister that may be selectively engaged with the pair of fixtures to connect the individual sections of tubing. The canister includes a hollow interior to accommodate a power cable splice. Also, the canister is sized to slide over at least one of the pair of fixtures to permit formation of the power cable splice.

According to another aspect of the invention, a method is provided for splicing two sections of coiled tubing in which each section has an internal power cable for supplying power to well equipment. The method includes mounting a fixture to each adjacent end of two sections of coiled tubing that are to be connected. The method also includes splicing the internal power cable intermediate the fixtures. Furthermore, the method includes enclosing the spliced internal power cable within a canister connected between the fixtures.

BRIEF DESCRIPTION OF THE DRAWINGS

The invention will hereafter be described with reference to the accompanying drawings, wherein like reference numerals denote like elements.

DETAILED DESCRIPTION OF THE PREFERRED EMBODIMENTS

Figure 1:
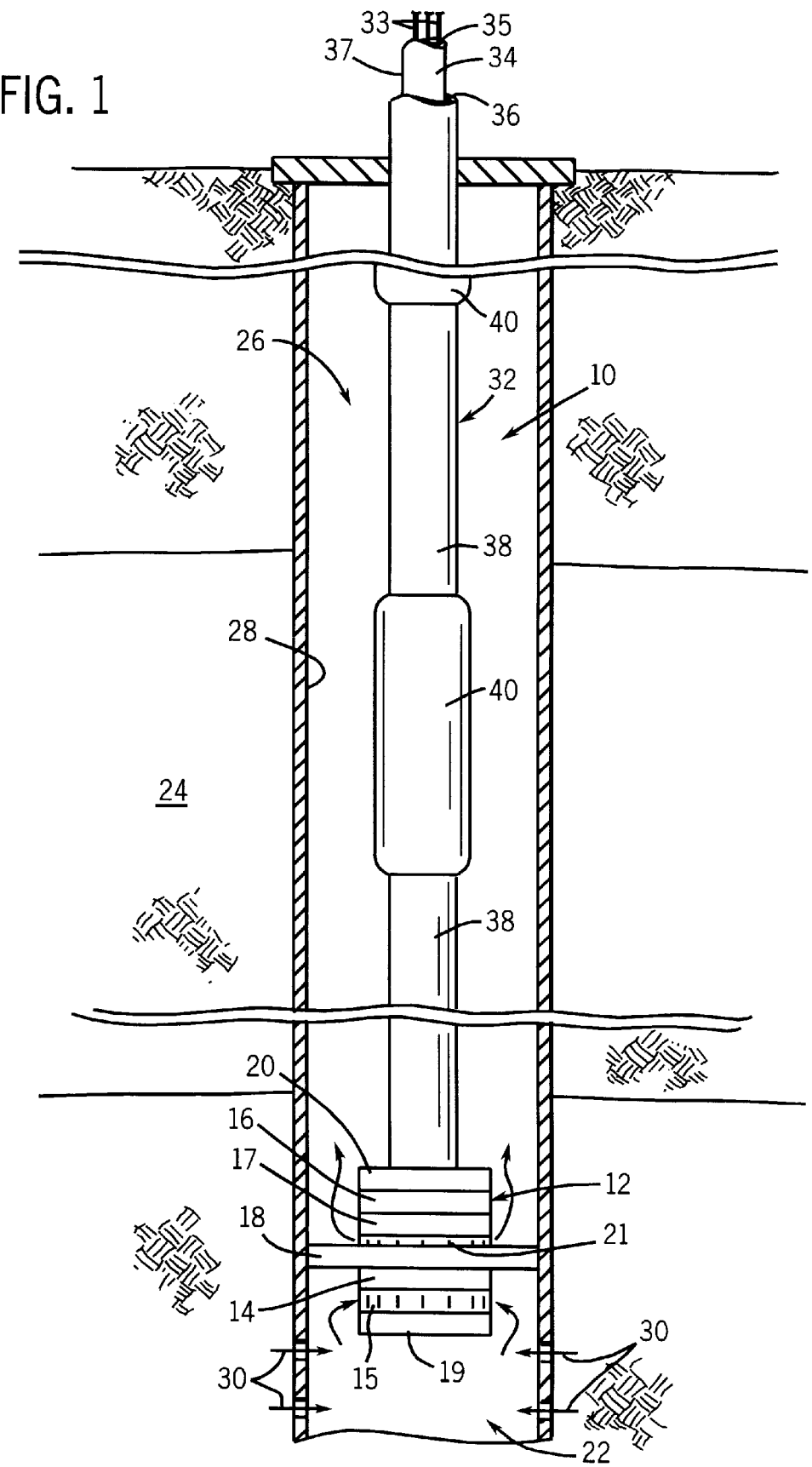
FIG. 1 is a front elevational view of an exemplary downhole pumping system deployed within a wellbore by deployment tubing, according to one embodiment of the present invention.

Referring generally to FIG. 1, an exemplary deployment system 10 is illustrated in a wellbore environment. Deployment system 10 is attached to an electric submergible pumping system 12 and preferably a bottom intake system. Deployment system 10 can be utilized in the deployment of a wide variety of devices or systems, but the unique design of deployment system 10 is particularly amenable to deployment of electric submergible pumping systems 12.

A typical bottom intake pumping system 12 may comprise a variety of components depending on the particular application or environment in which it is used. Typically, system 12 includes at least a submergible pump 14, a pump intake 15, a submergible motor 16, a motor protector 17 and a packer assembly 18. However, a variety of other or additional components can be utilized in the system.

For example, system 12 may include a thrust section 19 and a connector 20 by which submergible pumping system 12 is coupled to deployment system 10. Also, a variety of component types may be utilized. For instance, an exemplary motor 16 is a three-phase, induction-type motor, and an exemplary pump 14 is a multi-stage centrifugal pump. In this type of system, submergible pump 14 draws wellbore fluid through pump intake 15 and discharges it through a packer discharge head 21 above the packer assembly 18 into the annulus formed about deployment system 10. A variety of packer assemblies also may be utilized, such as a mechanically set packer or a hydraulic packer, e.g., the Camco HRP-1-SP Hydraulic Set Packer available through Camco of Houston, Tex.

In the example illustrated, system 12 is designed for deployment in a well 22 within a geological formation 24 that contains desirable production fluids, such as petroleum. In a typical application, a wellbore 26 is drilled and lined with a wellbore casing 28. Wellbore casing 28 may include a plurality of openings 30, often called perforations, through which production fluids flow into wellbore 26.

Although deployment system 10 may have a variety of forms and configurations, it typically comprises tubing, and preferably a coiled tubing 32. A power cable 34 is disposed within a hollow interior 36 of the tubing 32. The power cable 34 is supported within tubing 32 by appropriate anchors, buoyancy fluid or other means.

As illustrated, deployment system 10 comprises two or more segments 38 connected by one or more splice systems 40. Each segment 38 includes an outer tube, e.g. coiled tubing 32, and an internal power cable 34.

Figure 2:
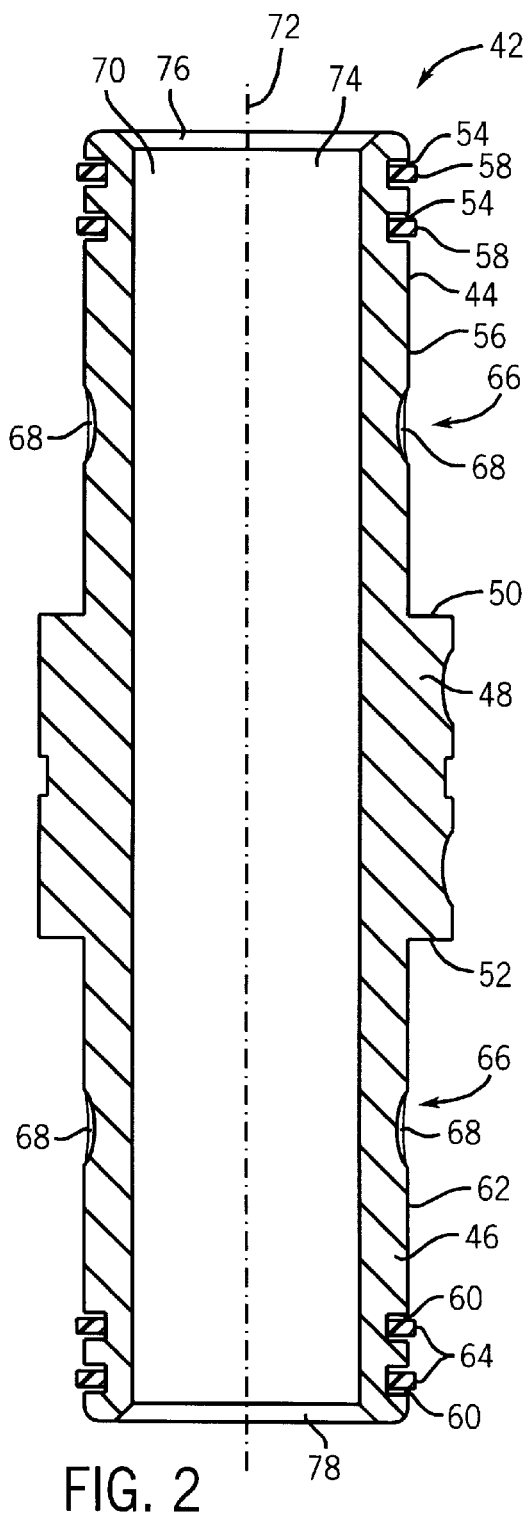
FIGS. 2 illustrate a partially cut-away view of an exemplary coiled tubing connector for use with the splice system illustrated in FIG. 1.

An exemplary embodiment of splice system 40 is illustrated in FIG. 2. Splice system 40 facilitates the joining of adjacent segments 38. Specifically, splice system 40 provides for the splicing of a first power cable section 42 with a second power cable section 44 at a power cable splice junction 46. Splice system 40 also provides for the splicing of two sequential or adjacent segments of tubing 32. The splicing of tubing 32 must provide sufficient structural integrity to permit deployment of an appropriate system, such as electric submergible pumping system 12, while protecting power cable splice 46.

In the illustrated embodiment, a lower fixture 48 is securely affixed to an end 50 of the tubing 32 of the lower segment 38. Preferably, one or more seals 52 are disposed between lower fixture 48 and the external surface of the corresponding segment 38 to prevent the seepage or flow of liquid therethrough.

Although a variety of fixtures may be utilized, a preferred fixture 48 comprises an external coiled tubing connector, e.g. a slip-type connector, such as those available from Camco of Houston, Tex., a division of Schlumberger Corporation. As is known to those of ordinary skill in the art, such slip-type connectors utilize a sloped surface that facilitates the tightening of the fixture against tubing 32.

An exemplary lower fixture 48 and its use is illustrated in FIGS. 2A through 2D. In this example, fixture 48 includes a housing 53, a body portion 54, a slip-lock 55 and a washer 56.

To assemble fixture 48 on tubing end 50, housing 53, slip-lock 55 and washer 56 are slid over tubing end 50, as illustrated in FIG. 2A. The tubing end 50 is then inserted into body portion 54 and slid past seal 52 and into abutment with an annular abutment ledge 57, as best illustrated in FIG. 2B. The slip-lock is then slid into an abutting engagement with body portion 54, as illustrated best in FIG. 2C. Subsequently, housing 53 is threaded into engagement with body portion 54 via a threaded region 58, as best illustrated in FIG. 2D. As housing 53 and body portion 54 are threaded together, slip-lock 55 is forced tightly against tubing end 50 by the tapered internal wall of housing 53. The tapered internal wall is disposed to slide along slip-lock 55 as the fixture is tightened. This holds the entire fixture securely to tubing end 50.

An upper fixture 60 is connected to the external surface of tubing 32 at upper segment 38. Upper fixture 60 preferably is similar to lower fixture 48 and includes one or more seals 62 disposed between the upper fixture 60 and corresponding segment 38 to prevent flow of liquid between segment 38 and fixture 60. Upper fixture 60 is designed for placement at a lower end 64 of the upper segment 38, which is disposed for connection with the upper end 50 of lower segment 38.

As described with respect to lower fixture 48, fixture 60 preferably is an external coiled tubing connector, e.g. a slip-type connector, such as those available from Camco. Upper fixture 60 may include a housing, body portion and slip-lock as described above with reference to FIGS. 2A–D. This permits fixture 60 to be tightened against the outside surface of segment 38, as known to those of ordinary skill in the art.

In the illustrated embodiment, upper fixture 60 is slightly modified relative to lower fixture 48. Specifically, the upper fixture 60 has been created with a smaller cross-sectional area to accommodate sliding engagement with a canister 72 that is designed to couple together lower fixture 48 and upper fixture 60.

In the embodiment shown, canister 72 is generally tubular and has a hollow interior 74 designed to accommodate power cable splice 46. Preferably, canister 72 includes a lower threaded region 76 and an upper threaded region 78. Lower threaded region 76 is disposed for threaded engagement with an externally threaded area 80 on lower fixture 48. (See FIGS. 2 through 2D). Similarly, upper threaded region 78 is disposed for threaded engagement with an externally threaded area 82 disposed on upper fixture 60, as illustrated in FIG. 2.

Preferably, canister 72 includes a narrowed or constricted region 84 disposed at upper threaded region 78 to prevent canister 72 from sliding past fixture 60 when the lower threaded region 76 is moved towards engagement with lower fixture 48. For example, the diameter of externally threaded area 82 may be slightly less than that of externally threaded area 80 to permit movement of the lower threaded region 76 of canister 72 past externally threaded area 82 as the splice is completed. Also, it is preferred that the lower and upper threaded regions 76, 78 and the externally threaded areas 80,82 have self-sealing threads to prevent the influx of wellbore fluids into hollow interior 74. Furthermore, canister 72 may include a vent 86 to permit the escape of gas from hollow interior 74 and the interior of the upper segment 38 if that segment is filled with fluid, e.g. a buoyancy fluid.

Figure 3:
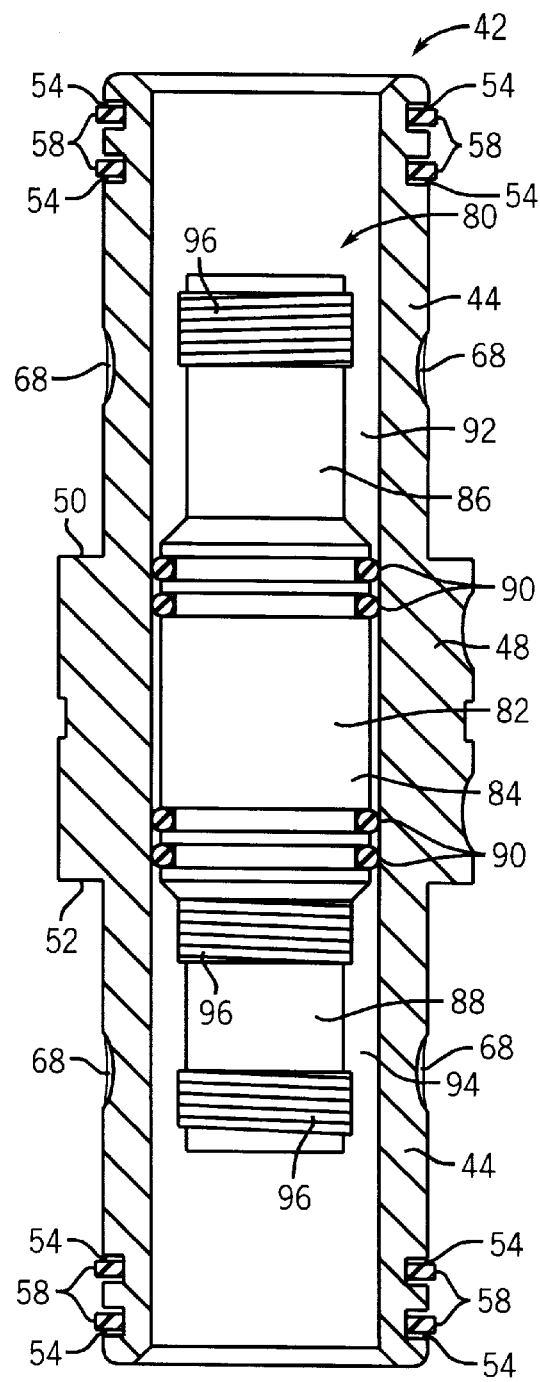
FIG. 3 illustrates an initial step in forming the splice system illustrated in FIG. 2.

Referring generally to FIGS. 3 through 7, the method of assembling splice system 40 is illustrated. With reference to FIG. 3, end 64 of a tubing segment 38, including first power cable section 42, are brought into proximity with end 50 of the next consecutive segment 38, including its corresponding internal power cable section 44.

Figure 4:
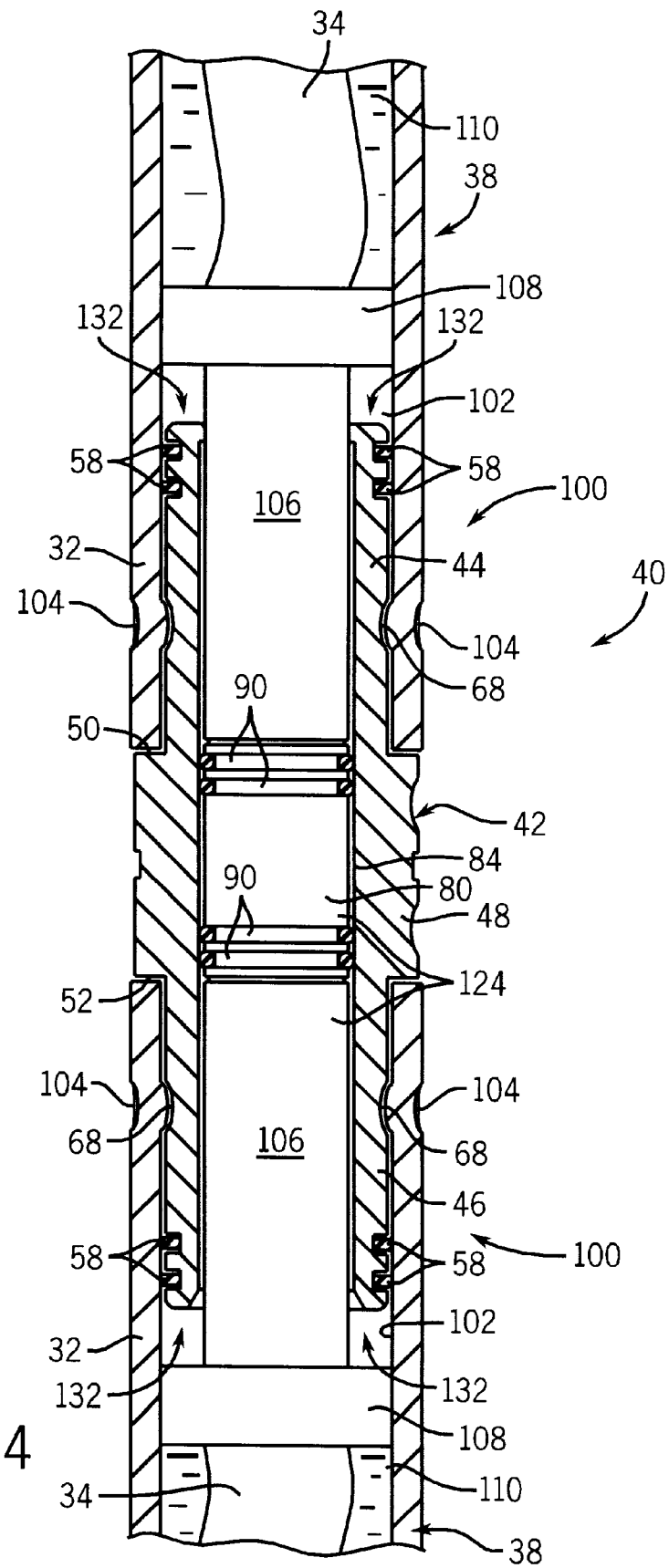
FIG. 4 illustrates a subsequent step in the formation of the splice system.

End 64 then is inserted through narrowed region 84 of canister 72, and canister 72 is slid along segment 38 until end 64 is left protruding through the opposite end of canister 72 (see FIG. 4). When canister 72 is in this position, both upper fixture 60 and lower fixture 48 are attached at segment ends 64 and 50, respectively.

Figure 5:
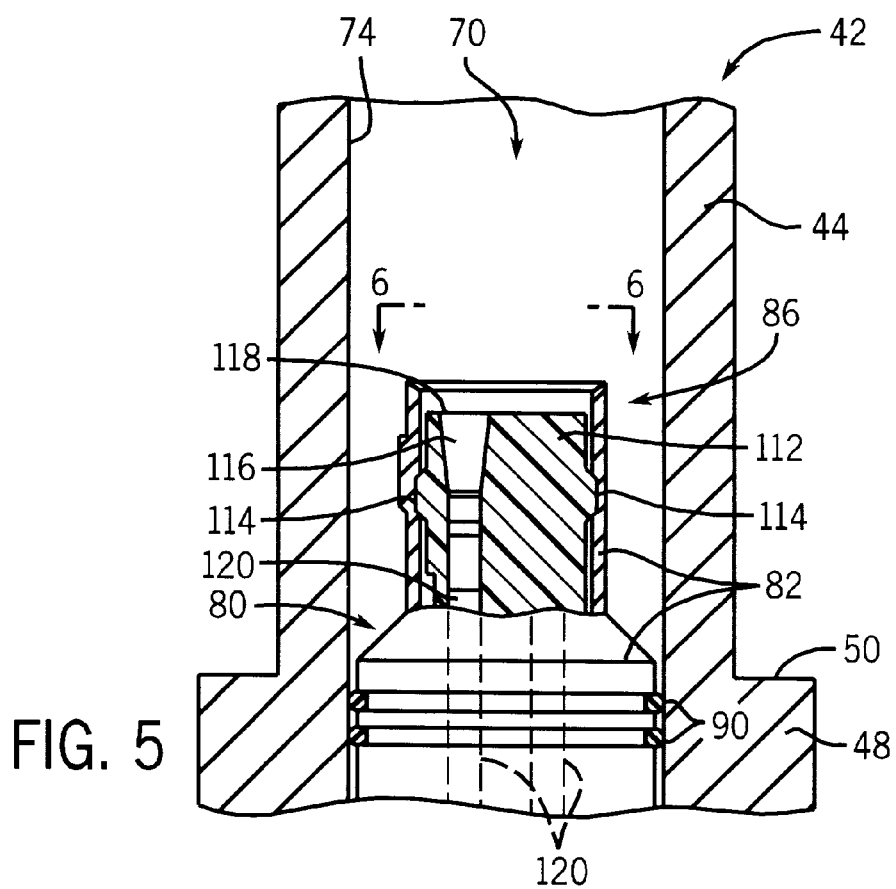
FIG. 5 illustrates an additional step in the formation of the splice system.

Following the positioning of canister 72 and fixtures 48, 60, power cable sections 42 and 44 are electrically connected. Typically, each power cable section includes at least three conductors for carrying three-phase power to submergible motor 18. The multiple conductors are connected, as illustrated in FIG. 5, and wrapped to form power cable splice 46, as illustrated in FIG. 2. The power cable splice may be formed in a variety of conventional ways, and typically is formed as a field splice, as known to those of ordinary skill in the art. At this time, upper fixture 60 is tightened such that locking portion 68 firmly forces gripping portion 66 into engagement with the exterior of segment 38.

Figure 6:
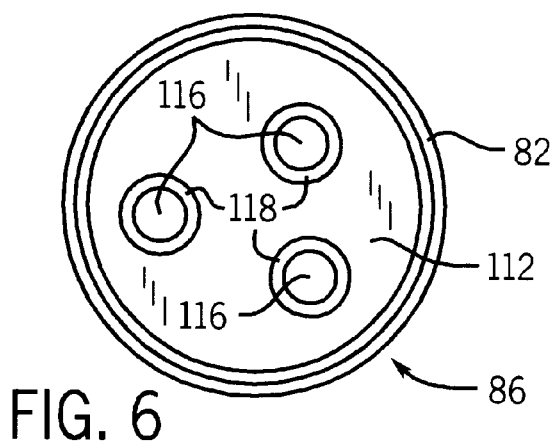
FIG. 6 illustrates an additional step in the formation of the splice system.
Figure 7:
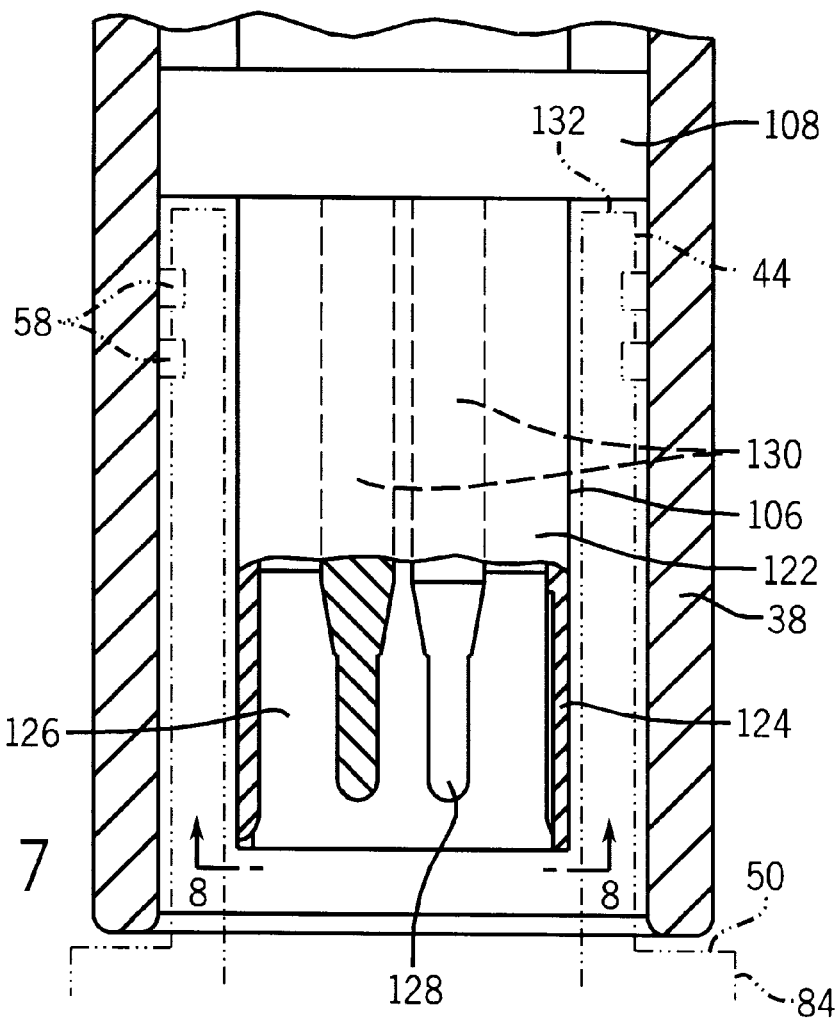
FIG. 7 illustrates an additional step in the formation of the splice system.

After upper fixture 60 is tightened, canister 72 is slid downwardly over power cable splice 46 until lower threaded region 76 engages external threaded region 80 and upper threaded region 78 engages external threaded region 82, as illustrated in FIG. 6. Then, canister 72 is rotated until it is firmly engaged with both upper fixture 60 and lower fixture 48. After tightening canister 72, housing 52 and body portion 54 may be threaded together to securely engage lower fixture 48 with end 50 of the lower segment 38, as illustrated in FIGS. 7 and 8.

Figure 8:
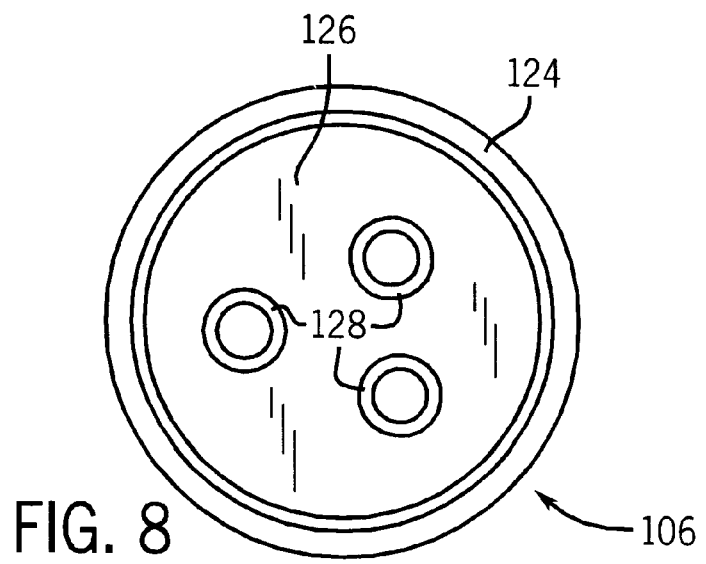
FIG. 8 illustrates an exemplary completed splice system shown as a partially cut-away view, according to one embodiment of the present invention.

As best shown in FIG. 8, the completion of splice system 40 provides a secure liquid-tight splice that protects the internal power cable. Additionally, the use of a relatively rigid canister, preferably formed from a metallic material, such as steel, provides sufficient structural integrity to facilitate deployment of a variety of well-related equipment. Depending on the downhole application and/or the depth of well 22, this type of splice system can be used to join two or more sections of tubing having integral power cable.

It will be understood that the foregoing description is of preferred exemplary embodiments of this invention, and that the invention is not limited to the specific forms shown. For example, a variety of fixtures may be used to rigidly engage the tubing; other types of tubing may be utilized in place of the preferred coiled tubing; the canister is preferably made from a metallic material, e.g. steel, although other materials may be appropriate for certain applications; the canister may be engaged with the fixtures by a variety of mechanisms other than screw threads; and a variety of other types of power cable splices may be utilized within the canister. Additionally, the method steps and their order may be modified for a given design or downhole application. These and other modifications may be made in the design and arrangement of the elements without departing from the scope of the invention as expressed in the appended claims.

What is claimed is:

1. A coiled tubing system in which sequential segments of coiled tubing are spliced together for deployment of downhole equipment, comprising:
   a first segment of coiled tubing having a first power cable disposed therein;
   a second segment of coiled tubing having a second power cable disposed therein;
   a first mounting fixture connected to the first segment of coiled tubing;
   a second mounting fixture connected to the second segment of coiled tubing; and
   a canister that may be selectively connected between the first and the second mounting fixtures, wherein the canister may be moved to accommodate splicing of the first and the second power cables intermediate the first and the second mounting fixtures.

2. The coiled tubing system as recited in claim 1, wherein the canister may be threadably engaged with the first and the second mounting fixture.

3. The coiled tubing system as recited in claim 1, further comprising a splice that electrically couples the first and the second power cable.

4. The coiled tubing system as recited in claim 1, wherein the first mounting fixture comprises a coiled tubing connector.

5. The coiled tubing system as recited in claim 4, wherein the second mounting fixture comprises a coiled tubing connector.

6. The coiled tubing system as recited in claim 5, wherein the canister may be threadably engaged with the first and the second mounting fixture.

7. The coiled tubing system as recited in claim 6, wherein the canister comprises a tubular section.

8. The coiled tubing system as recited in claim 7, wherein the first and the second mounting fixtures each include a threaded area having self sealing threads.

9. The coiled tubing system as recited in claim 1, wherein the canister includes a vent port.

10. A system for connecting sections of tubing that carry power cable therein for providing power to well related equipment, comprising:
    a pair of fixtures attachable to individual sections of tubing; and
    a canister that may be selectively engaged with the pair of fixtures to connect the individual sections of tubing, the canister including a hollow interior to accommodate a power cable splice, wherein the canister is sized to slide over at least one of the pair of fixtures to permit formation of the power cable splice, wherein the pair of fixtures each comprise a coiled tubing connector.

11. The system as recited in claim 10, wherein each fixture has a threaded region by which the canister may be threadably engaged.

12. The system as recited in claim 10, wherein the canister includes a tubular section having internal threads arranged to engage the threaded region of each fixture.

13. The system as recited in claim 10, wherein the canister is sealingly engaged with the pair of fixtures.

14. A system for coupling sections of coil tubing having a power cable disposed therein to supply electrical power to downhole equipment, comprising:
    a first mounting fixture securable to a first segment of coil tubing having a first power cable disposed therein;
    a second mounting fixture securable to a second segment of coil tubing having a second power cable disposed therein; and
    a connector having a hollow interior, the connector being operable to secure the first mounting fixture to the second mounting fixture and to house a splice between the first power cable and the second power cable within the hollow interior of the connector.

15. The system as recited in claim 14, wherein the connector is selectively securable to the first and second mounting fixtures to permit removal of the connector from the first and second mounting fixtures during formation of the power cable splice.

16. The system as recited in claim 14, wherein the first and second mounting fixtures have a threaded region by which the connector may be threadably engaged.

17. The system as recited in claim 16, wherein the connector comprises a tubular section having internal threads arranged to engage the threaded region of the first and second mounting fixtures.

18. The system as recited in claim 14, wherein the connector sealingly engages the first and second mounting fixtures.

* * * * *